United States Patent
Li et al.

(10) Patent No.: US 9,576,044 B2
(45) Date of Patent: *Feb. 21, 2017

(54) REGISTRATION OF CIM AGENT TO MANAGEMENT AGENT AND SYSTEM

(71) Applicant: INTERNATIONAL BUSINESS MACHINES CORPORATION, Armonk, NY (US)

(72) Inventors: Zhen G. Li, Shanghai (CN); Jun W. Zhang, Shanghai (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/075,487

(22) Filed: Mar. 21, 2016

(65) Prior Publication Data

US 2016/0205205 A1    Jul. 14, 2016

Related U.S. Application Data

(63) Continuation of application No. 14/525,486, filed on Oct. 28, 2014, now Pat. No. 9,305,078, which is a (Continued)

(30) Foreign Application Priority Data

Jul. 31, 2009    (CN) .......................... 2009 1 0161458

(51) Int. Cl.
  *G06F 17/30* (2006.01)
  *H04L 12/24* (2006.01)
  *H04L 29/08* (2006.01)

(52) U.S. Cl.
  CPC ......... *G06F 17/30607* (2013.01); *H04L 12/24* (2013.01); *H04L 41/046* (2013.01); *H04L 67/16* (2013.01); *H04L 41/0213* (2013.01)

(58) Field of Classification Search
  CPC .................... G06F 17/30286; G06F 17/30607; H04L 41/0273; H04L 41/046; H04L 12/24; H04L 41/0213; H04L 67/16
  (Continued)

(56) References Cited

U.S. PATENT DOCUMENTS 6,226,679 B1    5/2001  Gupta
6,704,747 B1 *  3/2004  Fong ................. G06F 17/30893
  (Continued)

FOREIGN PATENT DOCUMENTS

CN    101042704 A    9/2007

*Primary Examiner* — Thanh-Ha Dang
(74) *Attorney, Agent, or Firm* — Griffiths & Seaton PLLC

(57) ABSTRACT

A Common Information Model (CIM) agent is registered to a management agent in a computing environment by a processor device. The management agent is discovered by the CIM agent in a management domain in response to an insertion of the CIM agent into the management domain. At least one of information of the CIM agent and the discovered management agent is registered by the CIM agent. The management agent is compliant with the CIM agent. The management agent converts a CIM schema of the CIM agent into a schema at the management agent identifiable by the management agent according to a mapping specification corresponding to a management model of the management domain in response to a determination of no schema at the management agent corresponding to the CIM schema to be converted in the management agent that is compliant with the CIM agent.

16 Claims, 8 Drawing Sheets

Related U.S. Application Data continuation of application No. 13/732,470, filed on Jan. 2, 2013, now Pat. No. 8,903,865, which is a continuation of application No. 12/839,546, filed on Jul. 20, 2010, now Pat. No. 8,356,055.

(58) Field of Classification Search
USPC .......................................................... 707/791
See application file for complete search history.

(56) References Cited

U.S. PATENT DOCUMENTS

| | | | |
|---|---|---|---|
| 6,834,303 B1 * | 12/2004 | Garg | H04L 41/12 |
| | | | 370/254 |
| 7,231,550 B1 * | 6/2007 | McGuire | G06F 11/0709 |
| | | | 714/26 |
| 7,506,044 B2 | 3/2009 | Doshi et al. | |
| 7,512,590 B2 | 3/2009 | Boykin et al. | |
| 7,624,116 B2 | 11/2009 | Yin et al. | |
| 7,665,071 B1 | 2/2010 | Roles et al. | |
| 7,725,478 B2 | 5/2010 | Reeves et al. | |
| 7,756,958 B2 | 7/2010 | Nagarajrao et al. | |
| 7,966,394 B1 | 6/2011 | Talwar et al. | |
| 8,019,851 B2 | 9/2011 | Nagarajrao et al. | |
| 8,041,794 B2 | 10/2011 | Kohn et al. | |
| 8,132,189 B1 * | 3/2012 | Fuchs | G06F 9/541 |
| | | | 717/100 |
| 2002/0107872 A1 * | 8/2002 | Hudis | G06F 17/30557 |
| 2002/0144009 A1 | 10/2002 | Cheng et al. | |
| 2002/0174198 A1 | 11/2002 | Halter | |
| 2003/0131069 A1 * | 7/2003 | Lucovsky | G06F 21/335 |
| | | | 709/217 |
| 2003/0131142 A1 * | 7/2003 | Horvitz | G06F 21/335 |
| | | | 719/313 |
| 2003/0135657 A1 | 7/2003 | Barker et al. | |
| 2003/0204557 A1 | 10/2003 | Mandal et al. | |
| 2003/0217195 A1 | 11/2003 | Mandal et al. | |
| 2003/0233440 A1 | 12/2003 | Nakamura et al. | |
| 2004/0025142 A1 * | 2/2004 | Mandal | G06F 9/4428 |
| | | | 717/104 |
| 2004/0153775 A1 | 8/2004 | Bhattacharjee et al. | |
| 2005/0083854 A1 | 4/2005 | Nagarajrao et al. | |
| 2005/0114397 A1 * | 5/2005 | Doshi | H04L 12/24 |
| 2005/0193109 A1 | 9/2005 | Hudis et al. | |
| 2007/0226232 A1 * | 9/2007 | Yin | G06F 17/2264 |
| 2008/0170498 A1 * | 7/2008 | Shah | H04L 41/046 |
| | | | 370/230 |
| 2008/0208896 A1 | 8/2008 | Yin et al. | |
| 2008/0250169 A1 | 10/2008 | Coca et al. | |
| 2008/0263374 A1 | 10/2008 | Shah et al. | |
| 2009/0019082 A1 * | 1/2009 | Reeves | G06F 9/465 |
| 2009/0034424 A1 * | 2/2009 | Chen | H04L 41/06 |
| | | | 370/245 |
| 2009/0172680 A1 | 7/2009 | Boykin et al. | |
| 2009/0249361 A1 | 10/2009 | Amauba et al. | |
| 2009/0292801 A1 * | 11/2009 | Yang | H04L 41/0206 |
| | | | 709/223 |
| 2010/0082783 A1 | 4/2010 | Kohn et al. | |
| 2010/0205299 A1 | 8/2010 | Nagarajrao et al. | |
| 2011/0029555 A1 * | 2/2011 | Gao | G06F 21/00 |
| | | | 707/769 |

* cited by examiner

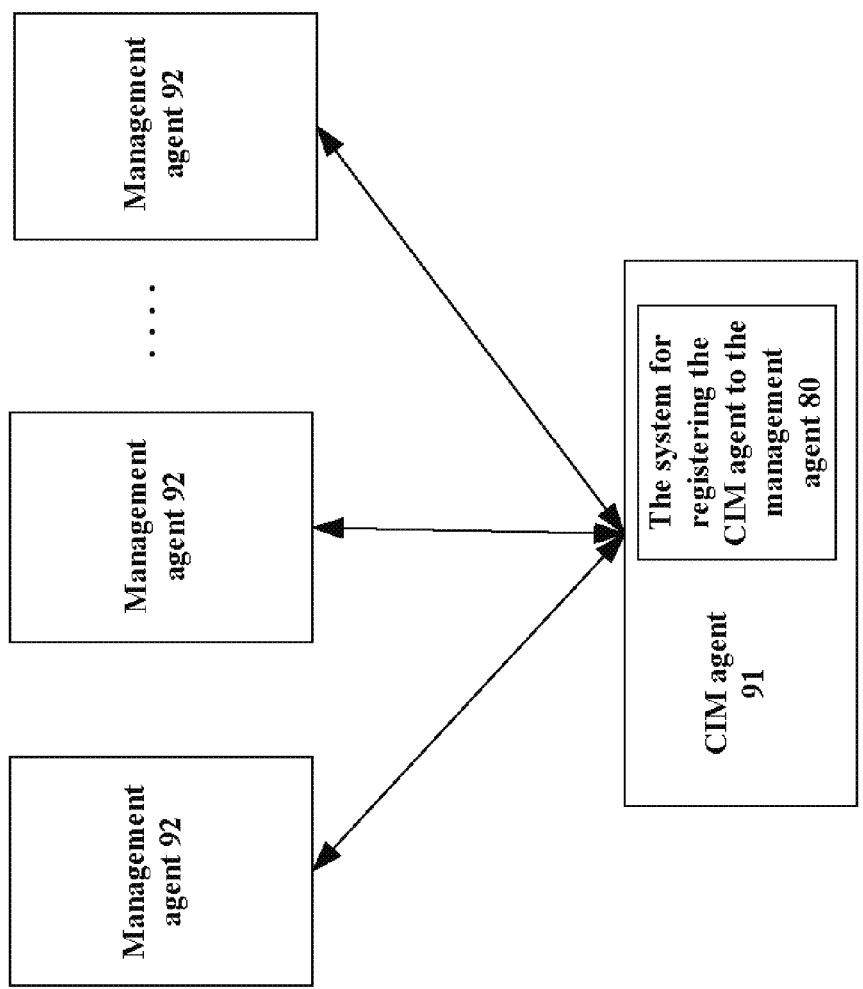

REGISTRATION OF CIM AGENT TO MANAGEMENT AGENT AND SYSTEM

CROSS-REFERENCE TO RELATED APPLICATIONS

The present application is a Continuation of U.S. patent application Ser. No. 14/525,486, filed Oct. 28, 2014, which is a Continuation of U.S. Pat. No. 8,903,865, filed Jan. 2, 2013, which is a Continuation of U.S. Pat. No. 8,356,055, filed Jul. 20, 2010, which claims priority to Chinese Patent Application No. 200910161458.4, filed Jul. 31, 2009 and entitled "Method and System for Registering CIM Agent to Management Agent and the Management System thereof," all of which are incorporated herein by reference.

BACKGROUND OF THE INVENTION

Field of the Invention

The present invention relates in general to information processing technology, and more particularly, to a method and system for registering a CIM agent to a management agent and management system.

Description of the Related Art

Web Services for Management (hereinafter referred to as "WS-Man" for short) is a management model released jointly by a number of Information Technology (IT) companies, and is a specification of realizing IT system management by using a Web service standard. WS-Man provides functionality of accessing and exchanging management information on an IT architecture based on the Web service standard to reduce management cost and complexity. By using Web services to manage the IT system, the IT system supporting WS-Man enables the IT administrator to remotely access the network components on its network from silicon components, handheld equipment, servers and large data centers, for example. In order to provide support for the WS-Man specification, many current operating systems contain components for providing WS-Man functions. With the continuous development of IT systems, the use of WS-Man functions is anticipated to increase.

Alternatively, the Common Information Model (CIM) is another common management model released by the Distributed Management Task Force (DMTF), and is a specification for describing the information of a management object. CIM uniformly defines the objects in the computer system management domain so as to describe the information of objects, such as network equipment, system, application programs, and the like in the management domain irrespective of a specific implementation such that the information can be used for other management tools.

The CIM standard is divided into two parts: the CIM specification and CIM schema. The CIM standard provides a formal definition of the model and is used for language description, naming, meta schema and the mapping technology to other management models. The CIM schema gives the description of the actual model. The CIM model is independent of any specific database, application, protocol and platform and can describe information such as desktop software and hardware configuration, the serial number of CPU package blocks and the flow level on a certain router port in specification form. At present, many IT corporations have widely adopted the CIM standard.

Due to the description capability of the CIM model to management objects, CIM models are integrated into many current management systems for use. In such management systems, when it is necessary to obtain the information of the management objects in the management domain in order to accomplish the specific system management tasks, the CIM schema is used to obtain the information of the management objects represented by the CIM model, and the management tasks are carried out based on the obtained information. The combination of the CIM model and the management system not only reinforces the function of the management system but also can expand the application scenario of the CIM model. This also applies to the above-mentioned WS-Man model, which can be used by integrating the CIM model.

FIG. 1 is a schematic diagram of the existing architecture of the WS-Man model based management system built up with the CIM model. As depicted in FIG. 1, three parts make up such architecture, including the CIM agent, the WS-Man agent and a management application. The CIM agent is implemented according to the CIM specification, and is used to provide parts of CIM functions and access to such management objects as equipment, system, and application programs in the IT system. In addition, based on the CIM standard, the CIM agent creates the CIM schema for describing the information of these management objects and thus further manages these CIM schemas.

WS-Man agent is implemented according to the WS-Man specification, and is used to provide parts of WS-Man functions and communication with the CIM agent via CIM Extensible Markup Language (CIMXML) protocol so that it can obtain the information of the management objects represented by the CIM schema from the CIM agent. In addition, the management application is located at the client of the IT system and is a system management part specifically implemented on the basis of WS-Man agent. The management application communicates with the WS-Man by Simple Object Access Protocol (SOAP) so that the application can access and exchange management information via the WS-Man agent, thereby realizing the specific system management tasks. The relation between WS-Man agent and the management application is similar with that between the server and the client. The WS-Man agent corresponds to the server for providing the WS-Man functions, while the management application corresponds to the management interface that is located at the client and realizes specific system management function with the WS-Man function provided by the WS-Man agent.

The above architecture as shown in FIG. 1 realizes a combination of the CIM schema and the WS-Man model. However, in some situations it is necessary to introduce manual operation. In a first situation, before the WS-Man agent needs to use a certain CIM agent to obtain the information of the management objects, the user must manually register the CIM agent to the WS-Man agent, and then the WS-Man agent can obtain the CIM schema describing the information of the management objects via the registered CIM agent. In a second situation, when the WS-Man agent obtains the CIM schema through specific CIM agent, the user must define the Web Services Description Language (WSDL) schema corresponding to the CIM schema according to the WS-CIM specification and import the defined WSDL schema into the WS-Man agent so that they can be identified by the WS-Man agent that can only identify the WSDL model. The above WS-CIM specification defines the binding relation between the CIM resources with both the WS-Man operation and WSDL definition.

In the existing architecture as shown in the above FIG. 1, as the above aspects necessitate the introduction of manual operation, system efficiency and convenience for the user are restricted. In addition, as in the acquisition of the CIM schema, it is necessary for user to define the corresponding WSDL schema according to the CIM schema, thus the user is required to sufficiently understand the above WS-CIM specification defining the corresponding relationship between CIM information and WSDL denotation, which may require user to have an extensive knowledge of technology.

SUMMARY OF THE DESCRIBED EMBODIMENTS

The above problems not only exist in the case that the WS-Man model-based management system built up with the CIM model, but also exist in management systems based on other management models such as Representational State Transfer (REST) built up with the CIM model. In view of the foregoing, a need exists for a management agent scheme such that the CIM agent can be automatically registered to the management system based on such management models as WS-Man, REST, and the like without the introduction of manual operation as previously described.

A Common Information Model (CIM) agent is registered to a management agent in a computing environment by a processor device. The management agent is discovered by the CIM agent in a management domain in response to an insertion of the CIM agent into the management domain. At least one of information of the CIM agent and the discovered management agent is registered by the CIM agent. The management agent is compliant with the CIM agent. The management agent converts a CIM schema of the CIM agent into a schema at the management agent identifiable by the management agent according to a mapping specification corresponding to a management model of the management domain in response to a determination of no schema at the management agent corresponding to the CIM schema to be converted in the management agent that is compliant with the CIM agent.

In addition to the foregoing exemplary embodiment, various other apparatus, computer program product, and method of manufacture embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 9 is a block diagram of a management system according to one embodiment of the invention.

DETAILED DESCRIPTION OF THE DRAWINGS

Figure 1:
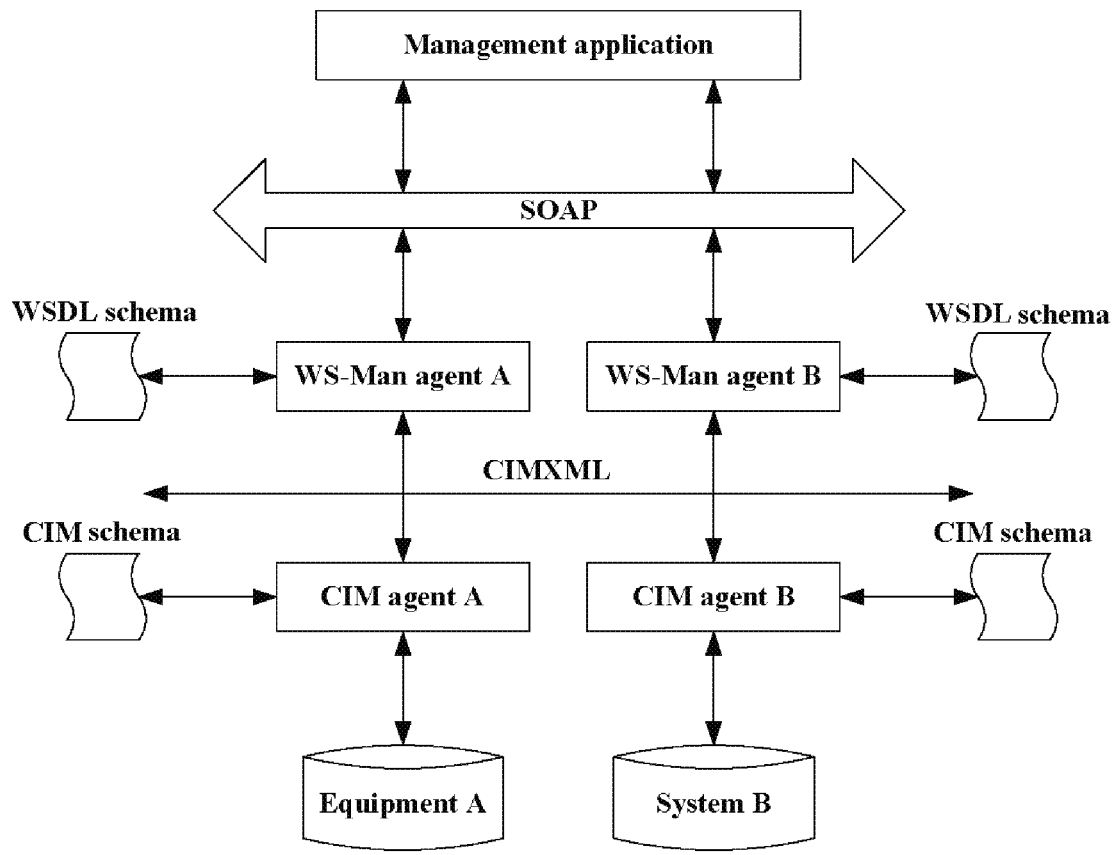
FIG. 1 is a schematic diagram of the architecture of the prior WS-Man model based management system built up with the CIM model.
Figure 2:
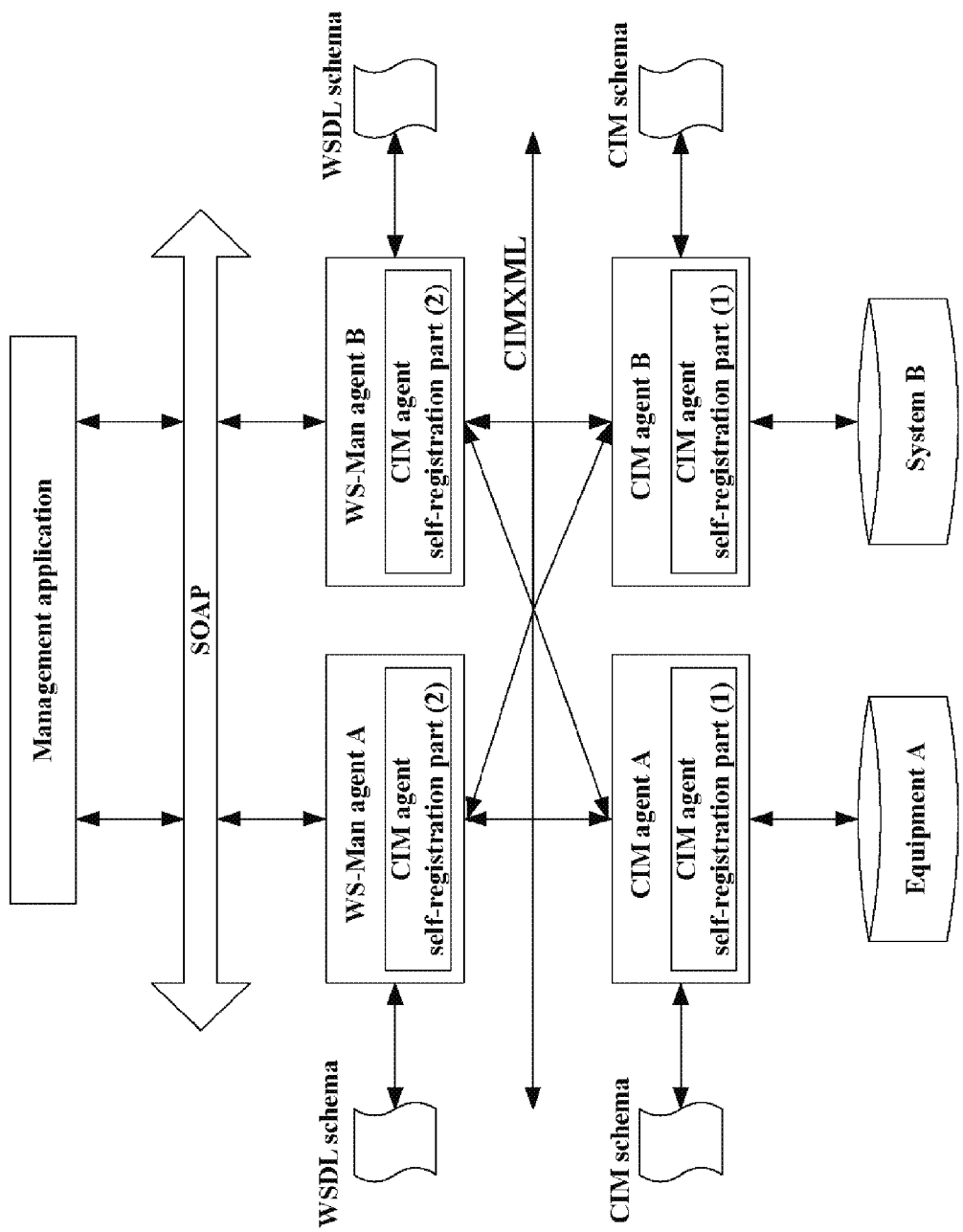
FIG. 2 is a schematic diagram of the architecture of the WS-Man model based management system built up with the CIM model according to aspects of the present invention.

FIG. 2, following, is a schematic diagram of the architecture of the WS-Man model based management system built up with the CIM model according to one embodiment of the present invention. As shown in FIG. 2, the architecture of the invention is similar as that shown in FIG. 1, and consists of three parts, i.e., a CIM agent, WS-Man agent and management application. In contrast to the depiction shown in FIG. 1, the functionality shown in FIG. 2 also includes self-registration functionality from the CIM agent to the WS-Man agent. The self-registration functionality of the CIM agent includes, in one embodiment, the self-registration portion of the CIM agent in the CIM agent (part (1)) and the self-registration portion of the CIM agent in the WS-Man agent (part (2)).

The self-registration portions of the CIM agent may, in one embodiment, discover the local or remote existing WS-Man agent and register the CIM agent to the compliant WS-Man agent in response to the case that the CIM agent is inserted into the IT system of the management domain. Therefore, by comparing with the prior technology, the above architecture of the invention can register the CIM agent to the WS-Man agent without the introduction of manual operation. In addition, as the discovery mechanism is employed to seek and determine the WS-Man agent that is compliant with the CIM agent, for any CIM agent, all the registrable WS-Man agents that are compliant with it may be discovered. Therefore, the registration relationship of one-to-many from the CIM agent to the WS-Man agent can be formed by registering the CIM agent to at least one of such compliant WS-Man agents.

Thus, unlike the case that, in the architecture as shown in FIG. 1, the CIM agent A of the management equipment A is only registered to the WS-Man agent A chosen by the user and the CIM agent B of the management system B is only registered to the WS-Man agent B chosen by the user according to the selection of the user, in the exemplary architecture of the invention as shown in FIG. 2, where it is determined that the each of WS-Man agents A and B is compliant with the CIM agent A, the CIM agent A may be registered to the WS-Man agents A and B simultaneously; similarly, where it is determined that each of WS-Man agents A and B is compliant with the CIM agent B, the CIM agent B may be registered to the WS-Man agents A and B simultaneously.

Consequently, even if either of the WS-Man agents A and B fails, the CIM agent A (or B) can be used through another WS-Man agent without registering again as the CIM agent A (or B) is registered to another one of the WS-Man agents A and B simultaneously. Indeed, like the prior technology, the CIM agent can be registered to one or part of the WS-Man agent.

It may be noted that, in the above basic conception and the description of following preferred embodiment, for simple description, it is only illustrated such case that the WS-Man model based management system is built up with the CIM model. However, this does not mean that the invention is limited thereto, instead, it is understood that, after reading the architecture of the invention described above and each of the preferred embodiments described below, those skilled in the art can readily apply the invention to other management modes such as the REST model according to the teaching thereof, thus the detailed description to these circumstances are omitted.

Figure 3A:
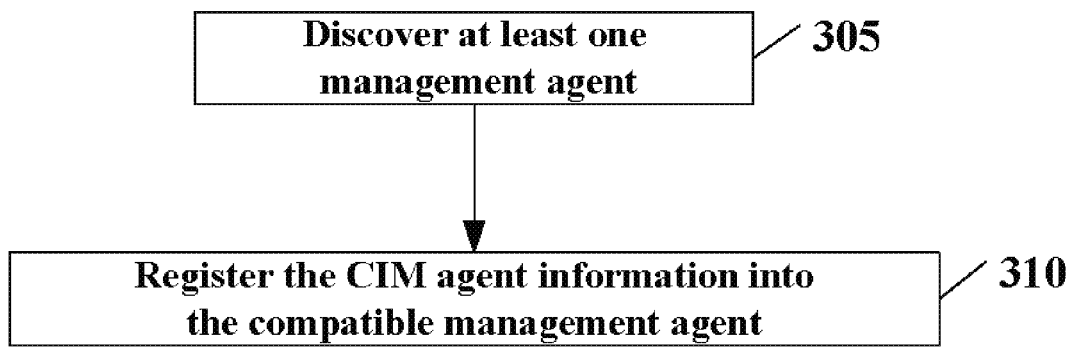
FIG. 3A is a general flow chart of a CIM agent method for registering a CIM agent to a management agent according to one embodiment of the invention.

FIG. 3A, following, is a general flow chart of a method for registering a CIM agent to a management agent according to one embodiment of the invention. In this embodiment, the description is made by taking the registration of the CIM agent A as an example; however, the CIM agent A does not refer to a certain CIM agent, instead, it refers to any CIM agent in a general sense.

As shown in FIG. 3, firstly, in step 305, the CIM agent A discovers at least one management agent in the IT system as the management domain in response to the case that the CIM agent is inserted into the IT system. In this step, if the above management domain is the management domain of the management system that is built up based on the WS-Man model, the CIM agent A will discover at least one WS-Man agent in such management domain. A detailed description will be made in connection with FIG. 4 hereafter for this step 305.

In step 310, the CIM agent A registers its own information into the management agent that is compliant with it among the at least one management agent discovered in step 305. It can be understood that, when several management agents are discovered in step 305, there may be several management agents that are compliant with the CIM agent A. A detailed description will be made in connection with FIG. 5 hereafter for this step 310.

Figure 3B:
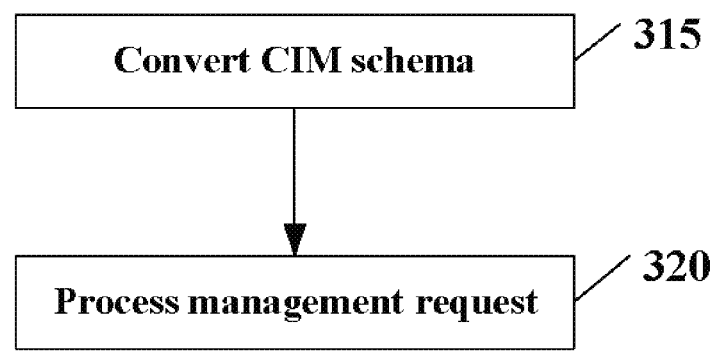
FIG. 3B is a general flow chart of a management agent method for registering a CIM agent to a management agent according to one embodiment of the invention.

FIG. 3B, following, is a general flow chart of a management agent method for registering a CIM agent to a management agent according to one embodiment of the invention. FIG. 3A and FIG. 3B are the steps on different module agents, but use the same method. According to FIG. 3B, in step 315, the compliant management agent converts the CIM schema of the CIM agent A into the schema at the management agent that can be identified by the compliant management agent. In this step, if it is the WS-Man model, then the schema at the management agent will be WSDL schema. A detailed description will be made in connection with FIG. 6 hereafter for this step 315.

Moreover, as shown in FIG. 3B, this method also includes the optional step 320. In such optional step 320, when the compliant management agent receives a management request in relation to the CIM agent from the management application at the client, such management request will be processed according to the information of CIM agent that is registered locally and its corresponding schema at the management agent. In such step, if it is the WS-Man model, the management request will be the SOAP request. A detailed description will be made in connection with FIG. 7 hereafter for this step 320. Further, a detailed description of step 305 in the method as shown in the above FIG. 3A will be described in connection with FIG. 4, in which the CIM agent A discovers at least one management agent.

Figure 4:
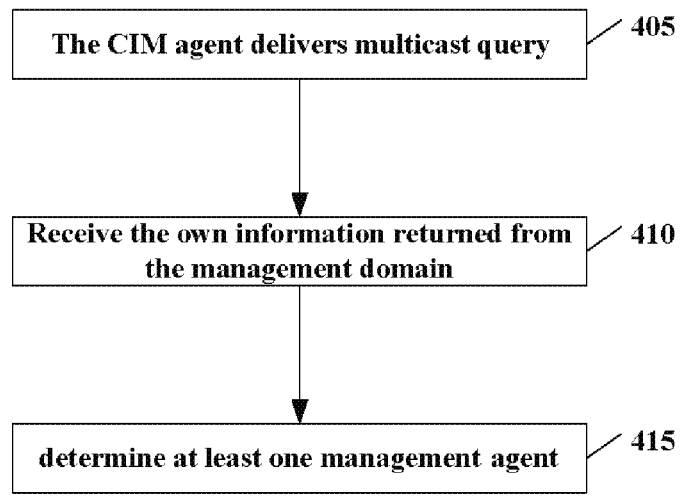
FIG. 4 is a detailed flow chart of step 305 in the method shown in FIG. 3A.

As shown in FIG. 4, firstly, in step 405, the registered CIM agent A delivers multicast query in such management domain according to a dynamic discovery protocol in the management domain. Specifically, the management domain takes the management domain of the management system built up based on the WS-Man model as an example. In such step, since this management domain is based on the WS-Man model, the CIM agent A delivers a multicast query in the IT system as management domain in accordance with a WS dynamic discovery protocol corresponding to the WS-Man model. This WS dynamic discovery protocol is a protocol used to seek for the Web services in the network; therefore, according to the multicast query delivered in the above IT system by this protocol, the Web service executed in this IT system will be found. Indeed, as for other management model than the WS-Man model, it may be required to replace the WS dynamic discovery protocol with another dynamic discovery protocol corresponding to this management model to discover the corresponding components in the management domain.

In step 410, the CIM agent A receives all of the own information returned by the management domain. Specifically, by taking the WS-Man model as example, since the CIM agent A delivers a multicast query according to the WS dynamic discovery protocol in step 405 and the Web service component in the IT system as management domain is the one corresponding to this multicast query, accordingly, in such step 410, at least one component corresponding to such multicast query in such IT system, i.e., the Web service component, will respond to such multicast query and return its own information to the CIM agent A. In step 415, the CIM agent A determines at least one management agent in accordance with the returned information.

In one embodiment, the information that is returned by at least one component corresponding to the multicast query in the management domain in step 410 includes at least the information identifying the component type. Thus, in this step 415, the CIM agent A will determine whether respective component of the returned information in the management domain is a management agent according to such identification information. Specifically, if it is the WS-Man model, the information returned by respective Web service component includes at least the information identifying this Web service component type, such as WS-Man type; therefore, in such step, the CIM agent A determines at least one WS-Man type service component from these Web service components according to this identification information. These WS-Man type service components are the objects to be discovered, i.e., the WS-Man agent. A detailed description of step 310 in the method as shown in the above FIG. 3A will be described in connection with FIG. 5, in which the CIM agent A registers its own information to the compliant management agent.

Figure 5:
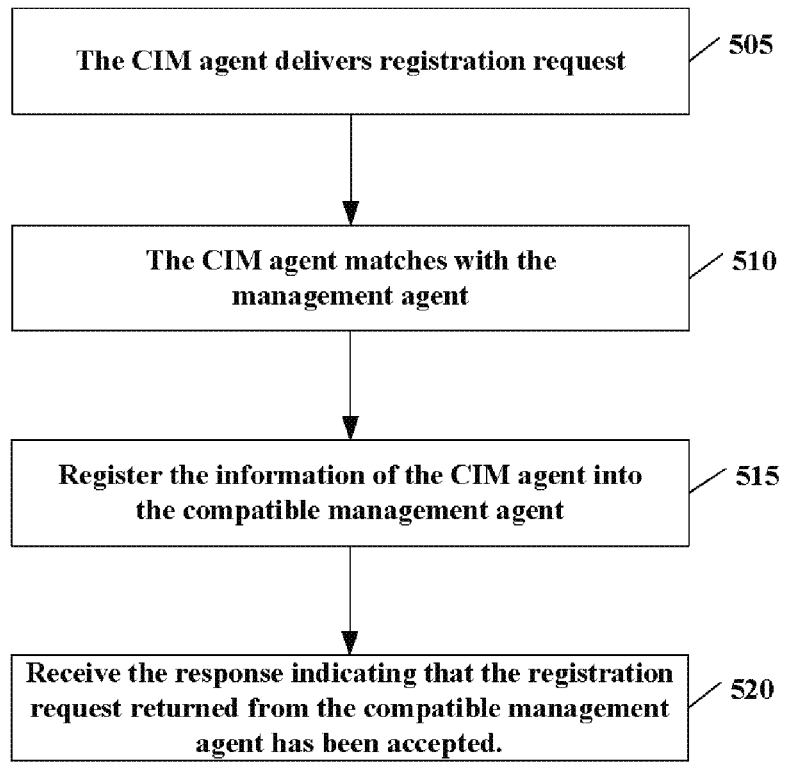
FIG. 5 is a detailed flow chart of step 310 in the method shown in FIG. 3A.

As shown in FIG. 5, firstly, in Step 505, the CIM agent A delivers a registration request to the at least one management agent (WS-Man agent in the case of a WS-Man model) discovered on the step 305. This registration request includes at least the most basic information about this CIM agent A. In one embodiment, as shown in Table 1 below, the registration request includes such information items as CIM agent location, domain name space, management object, and safety strategy etc., about the CIM agent A. The management object further includes the list of supporting specification and computer system instance information, and the safety strategy includes the authentication information.

TABLE 1

| CIM agent location | Domain name space | List of supporting specifications | Computer system instance information | Registration authentication information |
| --- | --- | --- | --- | --- |

For example, "CIM agent location" is the IP address of the CIM agent A, and "Computer system instance information" is the serial number (model number) of the equipment managed by the CIM agent A. It should be noted that the above information items are basic information for registering the CIM agent. Indeed, the registration request delivered by the CIM agent to the management agent is not limited to such basic information, but may correspondingly include many other information items.

In Step 510, each of the above at least one management agent will match itself with the CIM agent to determine whether it is compliant with the CIM agent A after receiving the registration request delivered from the CIM agent. In one embodiment, each of the at least one management agent has the predefined strategy for defining the management object scope of this management agent. Therefore, such a step functions to check whether it is compliant with the CIM agent A by matching the management object scope defined by the own predefined strategy of each of at least one management agent with the management objects of the CIM agent A. Such matching step may be executed in the at least one management agent, and can also be returned to the management object scope defined in its own predefined strategy by the management agent for matching by CIM agent.

In another embodiment, each of the at least one management agent has the defined strategy for defining the safety strategy. Therefore, in such step, other than matching by management object scope in the defined strategy, checks may be further performed as to whether it is compliant with the CIM agent A by matching the safety strategy defined by the own defined strategy of each of the at least one management agent with the safety strategy of the CIM agent A. Likely, this matching step may be executed in the at least one management agent, and can also be returned to the safety strategy defined in its own predefined strategy by the management agent for matching by CIM agent.

In one embodiment, the predefined strategy of each of the at least one management agent defines the management object scope or safety strategy of the management agent by means of defining the information items corresponding to the registration request of the CIM agent. In such a case, each management agent will match the information items in the registration request with its own predefined strategy to determine whether it is compliant with the CIM agent. For example, the predefined strategy of a certain management agent, such as the WS-Man agent, defines the management object scope of the management agent by the definition of such information item as "Computer system instance information", i.e., the management agent only accepts the registration of the CIM agent that is responsible for managing the specific equipment, such as a memory device. Therefore, this management agent may determine whether the CIM agent delivering such registration request is compliant with itself by the consistency between the information item "Computer system instance information" in the received registration request and the information item "Computer system instance information" defined in its own predefined strategy. For example, the predefined strategy of a certain management agent may define the safety strategy of such management agent by defining the information item "Registration authentication information), i.e., such management agent only accepts the registration of the CIM agent with specific registration authentication information.

It is noted that, the definition for a certain information item in the predefined strategy of respective management agent may be a scope, i.e., this management agent is defined to only accept the registration of the CIM agent within a specific scope. In addition, the predefined strategy of each management agent may also include the definition to multiple information items simultaneously. Moreover, in one embodiment, the predefined strategy of each management agent is dynamically changed according to the user's configuration.

In Step 515, in response to the case that the management agent that is compliant with the CIM agent A is determined, if the matching step is executed by the compliant management agent, then the management agent that is compliant with the CIM agent A will register the information of the CIM agent in accordance with the above registration request; if the matching step is executed by the CIM agent, then the CIM agent A will register it to the compliant management agent.

Specifically, in such step, if the matching step is executed by the compliant management agent, the management agent determining that the CIM agent A is compliant with itself will capture respective information item from the above registration requests delivered by the CIM agent A, and preferably these information items are recorded in its local registration database. If the matching step is executed by the CIM agent, then the CIM agent A may deliver a registration confirmation again; and the compliant management agent will capture respective information item from the registration confirmation delivered by the CIM agent A, and preferably these information items in are recorded its local registration database.

The information items of the CIM agent recorded in the database of respective management agent may be indexed with the information items such as CIM agent domain name space or the host identifier distributed to the CIM agent etc., or with the port information by which such management agent uses to communicate with the CIM agent. Moreover, in the at least one management agent, the management agent that the CIM agent A is not compliant with it is determined and the information of the CIM agent A will not be registered. In step 520, after the management agent in the at least management agent that is compliant with the CIM agent A is registered, the CIM agent A will receive the returned response indicating that the above registration request has been accepted.

It is noted that, the invention does not have any special limit to the execution order of Step 515 and Step 520 as shown in FIG. 5. These two steps may be executed in the order reverse to the above order or executed at the same time. A detailed description of step 315 in the method as shown in FIG. 3B will be described in connection with FIG. 6, in which the CIM schema is converted. As stated above, there may be several management agents among the at least one management agents discovered by the CIM agent A that are compliant with the CIM agent A. However, since the schema conversion processes performed by each compliant management agent are the same, only one compliant management agent need be explained as is shown below.

Figure 6:
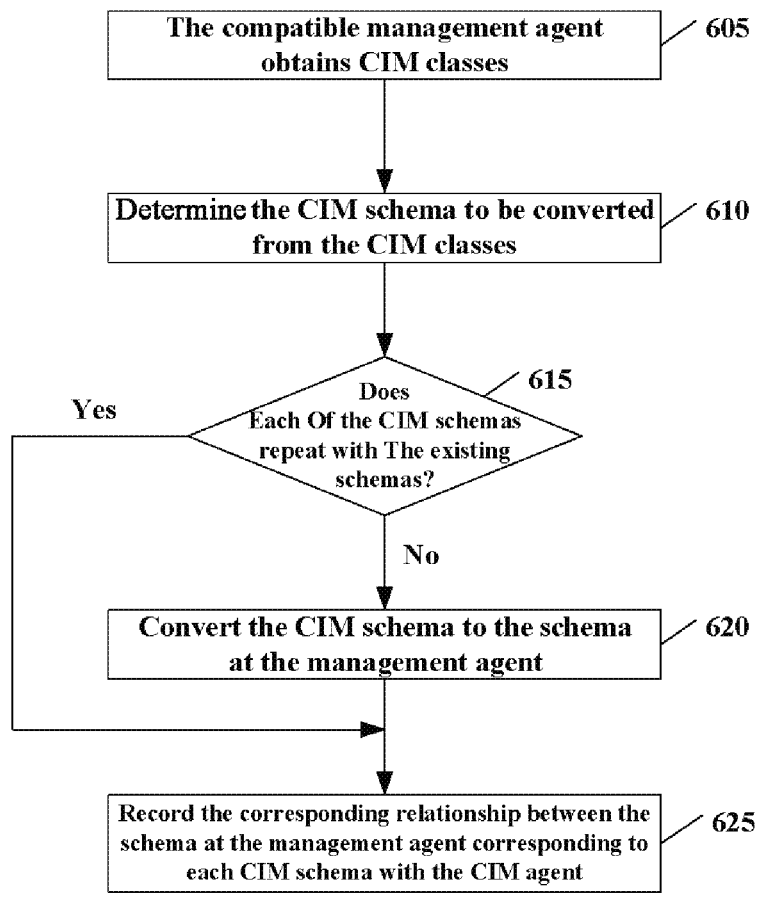
FIG. 6 is a detailed flow chart of step 315 in the method shown in FIG. 3B.

As shown in FIG. 6, in Step 605, the compliant management agent (WS-Man agent if it is WS-Man model) obtains all CIM classes from such CIM agent A by setting up a communication connection with the CIM agent A. In step 610, the compliant management agent determines the CIM classes from the obtained CIM classes, and then determines the CIM schema to be converted from these CIM classes. In step 615, the compliant management agent searches the local or the local registration database for respective one of the CIM schema to be converted to check whether such CIM schema is repeated with the existing schema, i.e. whether there is stored the schema at the management agent (WSDL schema if it is WS-Man model) converted from the same CIM schema as this CIM schema in the management agent or in the registration database of the management agent irrespective whether this same CIM schema is from the CIM agent A or not. The so-called two same CIM schemas indicate that the equipment types described by these two CIM schemas are the same.

In step 620, in response to a determination of no schema at the management agent corresponding to the CIM schema to be converted in the compliant management agent, the compliant management agent converts such CIM schema into the corresponding schema at the management agent according to the mapping specification corresponding to the management model of the management domain and records it into the registration database.

The above management domain takes the management domain of the management system built up based on the WS-Man model as example. If the management agent or its registration database does not have the CIM schema of the schema at the management agent obtained from the conversion of the CIM schema the same as it, then the compliant management agent converts this CIM schema into the WSDL schema according to the WS-CIM specification corresponding to the WS-Man model. As the conversion from the CIM schema to the WSDL schema is a common known technology for those skilled in the art, the detailed description for it is omitted herein.

In step 625, the management agent associates the schema at the management agent corresponding to the converted CIM schema with the CIM agent A, and records this corresponding relationship into the management agent, and preferably into the registration database of the management agent. For the CIM schema converted in step 620 among the CIM schemas, the schema at the management agent obtained from the conversion is simply the schema at the management agent corresponding to it; but for the CIM schema not converted in step 620, the schema at the management agent that has been stored in the management agent or its registration database and is obtained from the conversion of the same CIM schema is simply the schema at the management agent corresponding to this CIM schema.

It can be seen from the above steps 615-625, in this embodiment, for the CIM schema of a newly registered CIM agent, only when the registration database does not have the schema at the management agent corresponding to it, may this CIM schema be converted and recorded. By such means, the minimum workload of schema conversion and registration database space occupied by the schema at the management agent can be ensured. This cannot be realized in case of manual registration by the user. In addition, via the conversion of the CIM schema, the CIM agent and its CIM schema are presented as the component with unique label and described by the schema at the management agent in the compliant management agent. The schema at the management agent obtained by converting from the CIM schema constitutes component interfaces at the management agent presented by the management application at the client, and the management application may deploy these interfaces via its own configuration and use these interfaces to access the CIM agent with these interfaces.

Table 2 below shows, on the basis of Table 1 above, the summary of the registration list of the CIM agent formed in the local registration database by the WS-Man agent after CIM agent completes the conversion and record of the CIM schema. This registration list may include multiple items, each of which corresponds to one registered CIM agent. Obviously, this registration list can make each registered CIM agent and its CIM schema as the service described by WSDL to be presented to the management application at the client.

TABLE 2

| CIM agent location | Domain name space | List of supporting specifications | Computer system instance information | Registration authentication information | WSDL schema list |
| --- | --- | --- | --- | --- | --- |

On the basis of the above content, detailed description in step 320 processing the management request in the method as shown in FIG. 3B will be described below in connection with FIG. 7. In the following description, one compliant management agent is taken as the example.

Figure 7:
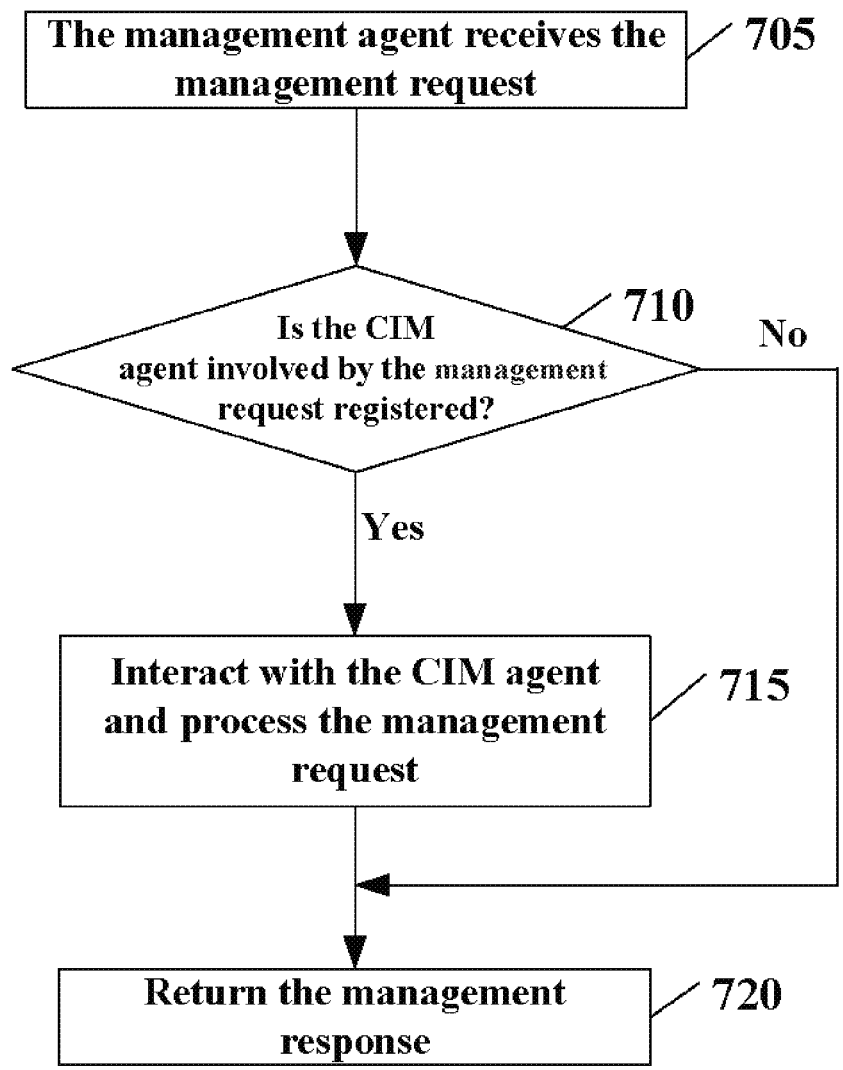
FIG. 7 is a detailed flow chart of step 320 in the method shown in FIG. 3B.

As shown in FIG. 7, in step 705, the compliant management agent receives a management request related to the CIM agent from the management application located at the client. In a WS-Man model implementation, this management request is the SOAP request related to the CIM agent. In step 710, the compliant management agent will determine whether the CIM agent involved in the management request has been registered in the management agent.

Preferably, the compliant management agent will search its local registration database to determine whether there is registration item corresponding to the CIM agent identified in the management request. Further, with the registration list as shown in Table 2 above, the compliant management agent may search the registration list according to the address URI of the CIM agent identified in the management request so as to determine whether the registration list has registration item corresponding to the address URI.

If it is determined in step 710 that the CIM agent involved in the management request has been registered, then in step 715, the compliant management agent will interact with the CIM agent in order to perform the process corresponding to the management request. Specifically, the compliant management agent delivers the received management request to the CIM expansion part in the management agent that interacts with the registered CIM agent and thus processes the management request in relation to the CIM agent. The CIM expansion part will perform a series of processes including the generation of actual CIM request, the delivery of the CIM request to the CIM agent, the reception of response from the CIM agent, the encapsulation of the CIM response (SOAP encapsulation if it is WS-Man model) as well as the generation of a management response (SOAP response if it is WS-Man model) etc.

Subsequently, in step 720, the compliant management agent generates the management response indicating whether the management request is processed successfully or not according to the result of step 720, and then returns it to the management application. Preferably, if the management request has been processed successfully in step 720, the management agent will generate the response indicating that the process is successful; on the other hand, if the management request is not successfully processed or the CIM agent involved in the management request determined in step 710 is not registered, the response of failure will be generated and delivered to the management application as error management response in order to indicate that the management request has not been processed successful or the CIM agent involved in the management request cannot be reached.

It is noted that, the procedure of the management request as shown in FIG. 7 is only an example procedure. The procedure in which the management agent processes the management request received from the management application according to the content in the registration database may be implemented with any known approach, as will be understood by those of ordinary skill in the art. The above is the detailed description of the method to register the CIM agent to the management agent of this embodiment. The mechanisms of the present invention may eliminate the burden of manual operation by the user, improving the registration efficiency of the CIM agent and further improving the management efficiency of the management system. In addition, in this embodiment, the same multiple CIM schemas don't need schema conversion and record repeatedly so that the minimum workload of schema conversion and registration database space occupied by the schema at the management agent can be ensured. Additionally, the mechanisms of the present invention provide a system for registering a CIM agent to a management agent. Below is a detailed description of an exemplary system in connection with attached figures.

Figure 8:
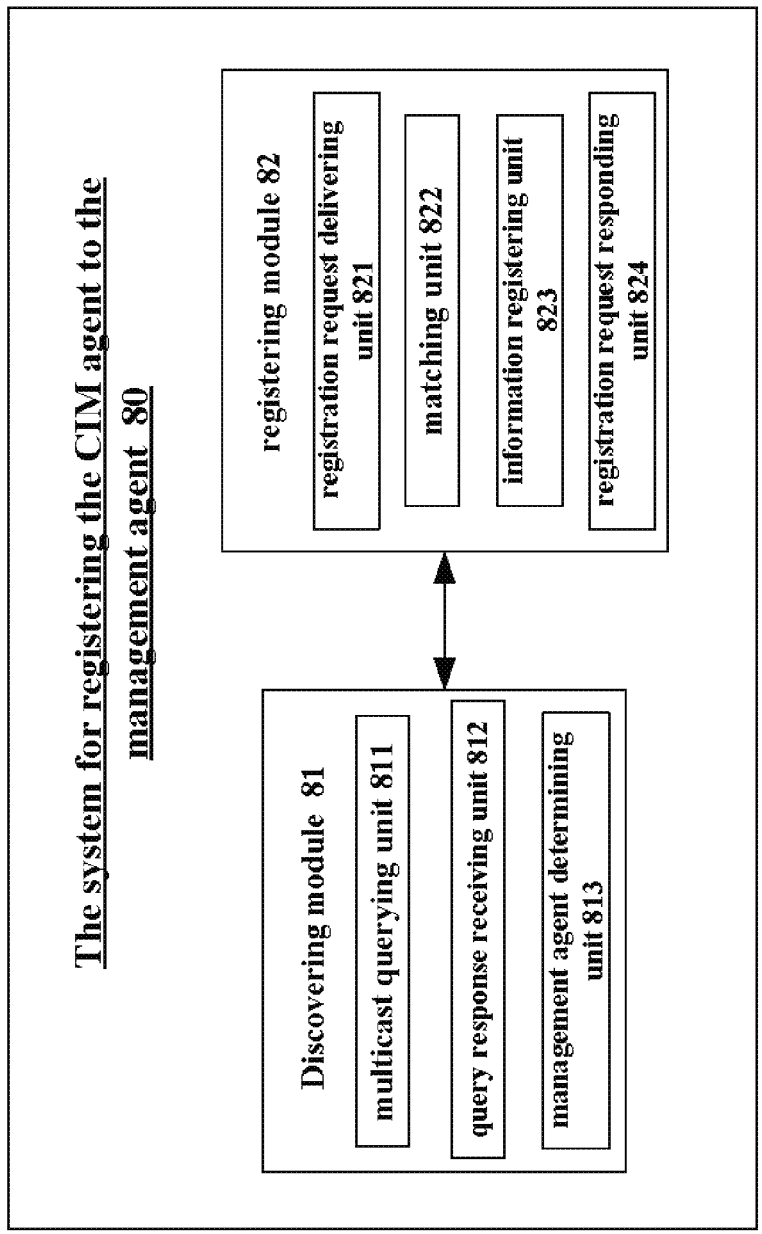
FIG. 8 is a block diagram of a system for registering a CIM agent to a management agent according to one embodiment of the invention.

FIG. 8 is a block diagram of the system for registration of the CIM agent to the management agent in this exemplary embodiment. In such embodiment, the registration of the CIM agent A is taken as the example for the description. As shown in FIG. 8, the system 80 of this embodiment for registering the CIM agent to the management agent includes discovering module 81 and the registering module 82, wherein schema converting module (not shown in FIG. 8) of the management agent that is compliant with the CIM agent converts the CIM schema of the CIM agent into the schema at the management agent that can be identified by the compliant management agent. The discovering module 81 discovers at least one management agent in the management domain in response to the case that the CIM agent A is inserted into the management domain.

As shown in FIG. 8, the discovering module 81 further includes multicast querying unit 811, query response receiving unit 812 and management agent determining unit 813. The multicast querying unit 811 delivers multicast query in the management domain according to a dynamic discovery protocol of the management domain. The query response receiving unit 812 receives the information returned by the management domain. In one embodiment, at least one component in the management domain corresponding to the multicast query returns its own information in response to the multicast query; and the own information returned by these components includes the information identifying the component types.

The management agent determining unit 813 determines at least one management agent according to the returned information. In an embodiment, the management agent determining unit 813 determines at least one management agent from these components according to the information identifying component types in its own information returned from at least one module corresponding to the multicast query in the management domain. Subsequently, the registration module 82 in FIG. 8 registers the information of the CIM agent A to the management agent that is compliant with the CIM agent A in the at least one management agent discovered by the discovering module 81.

As shown in FIG. 8, the registration module 82 further includes registration request delivering unit 821, matching unit 822, information registering unit 823 and registration request responding unit 824. The registration request delivering unit 821 delivers registration request to at least one management agent discovered by the discovering module 81 for the CIM agent. In one embodiment, the registration request includes the CIM agent location, domain name space, and management object and safety strategy in relation to the CIM agent A. The matching unit 822 matches with the CIM agent A by each of the at least one management agent discovered by the discovering module 81, so as to further determine the management agent that is compliant with the CIM agent A.

In one embodiment, the matching unit 822 determines the management agent that is compliant with the CIM agent A by matching management object scope defined in predefined strategy of the management agent with management object of the CIM agent, for each of the discovered at least one management agent. In another embodiment, the matching unit 822 determines the management agent that is compliant with the CIM agent by matching safety strategy defined in the predefined strategy of the management agent with safety strategy of the CIM agent A, for each of the discovered at least one management agent.

The information registration unit 823 registers respective information item in the registration request of the CIM agent A to the management agent that is compliant with the CIM agent A determined in the at least one management agent in response to the case that the management agent that is compliant with the CIM agent A is determined. The registration request responding unit 824 returns a response indicating that the registration request is accepted to the CIM agent A for the management agent that is compliant with the CIM agent A.

The CIM agent A further includes CIM class delivering unit (not shown in FIG. 8), for setting up a communication connection between the CIM agent and the compliant management agent; and the CIM agent will deliver all CIM classes to the compliant management agent in response to the request of the compliant management agent. The schema converting module further includes CIM class capturing unit, CIM schema determining unit, repetition schema checking unit, schema converting unit and corresponding relationship recording unit. The CIM class capture unit captures all CIM classes from such CIM agent A by setting up a communication connection with the CIM agent A. The CIM schema determining unit determines the static CIM class as the CIM schema to be converted from the CIM classes captured by the CIM class capturing unit.

The repetition schema determining unit checks whether there is corresponding schema at the management agent converted from the CIM schema the same as the CIM schema in the compliant management agents for the respective CIM schema to be converted. The schema converting unit converts the CIM schema to the schema at the management agent that can be identified by the applicant management agent according to a mapping specification corresponding to the management model of the management domain and records it in the compliant management agent, in response to the case that there is no schema at the management agent corresponding to the CIM schema to be converted in the compliant management agent.

The corresponding relationship recording unit records a corresponding relationship between the schema at the management agent corresponding to the converted CIM schema and the CIM agent A into the compliant management agent. The compliant management agent also includes optional management request processing module, which processes the management request from the management application from the client and relating to the CIM agent for the compliant management agent according to the registered CIM agent information and its corresponding schema at management agent.

Preferably, the management request processing module further includes a management request receiving unit, which receives a management request in relation to the CIM agent from the management application for the compliant management agent; a registration determining unit, which determines whether the CIM agent involved in the management request has been registered to the compliant management agent; a management request processing unit, which interacts with the CIM agent involved in the management request so as to perform the process corresponding to the management request and returns the management response to the management application when determining it has registered; and a management request responding unit, which returns a management response indicating whether the management request is processed successfully to the management application for the compliant management agent. The above is the detailed description is the system 80 for making the CIM agent register itself to the management agent in this exemplary embodiment.

Below is the description of the management system including the above exemplary system 80 of the illustrated embodiments. FIG. 9 is a block diagram of the management system according to one exemplary embodiment of the invention. As shown in FIG. 9, the management system 90 of this embodiment includes CIM agent 91, one or more management agents 92, and the system 80 for registering the CIM agent to the management agent as shown in FIG. 8. However, as can be understood by those skilled in the art, the arrangement of the system 80 in the management system 90 as shown in FIG. 9 is only one example. As long as the CIM agent 91 is registered into one or more management agents 92, the arrangement of the system 80 in the management system 90 can be random and be independent from the CIM agent 91 and the management agent 92.

It is noted that, the systems 80 and 90 and their integral parts may be constituted with specific circuits or chips and may be realized by the computer (processor) for carrying out the corresponding program. Although the above described the detailed descriptions of the method and system for registering the CIM agent to the management agent and the management thereof of the invention through some illustrative embodiments, these embodiments are not exhaustive, and those skilled in the art may make various changes and modifications within the spirit and the scope of the invention. Therefore, the invention does not limit to these embodiments and the scope of the invention is only subject to the attached claims hereinafter.

As will be appreciated by one skilled in the art, aspects of the present invention may be embodied as a system, method or computer program product. Accordingly, aspects of the present invention may take the form of an entirely hardware embodiment (e.g., microprocessor or processor device), an entirely software embodiment (including firmware, resident software, micro-code, etc.) or an embodiment combining software and hardware aspects that may all generally be referred to above as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for registering a Common Information Model (CIM) agent to a management agent in a computing environment by a processor device, comprising:
   discovering, by the CIM agent, the management agent in a management domain in response to an insertion of the CIM agent into the management domain; and
   self-registering, by the CIM agent, at least one of information of the CIM agent and the discovered management agent, the management agent compliant with the CIM agent;
      wherein the management agent converts a CIM schema of the CIM agent into a schema at the management agent identifiable by the management agent according to a mapping specification corresponding to a management model of the management domain in response to a determination of no schema at the management agent corresponding to the CIM schema to be converted in the management agent that is compliant with the CIM agent, and the management agent is determined by matching a management object scope, or safety strategy defined in a predefined strategy of the discovered management agent with a management object, or safety strategy of the CIM agent.

2. The method of claim 1, further including, previous to matching the management object scope, initiating, by the CIM agent, a registration request to the discovered management agent, wherein the registration request includes at least one of a CIM agent location, a domain name space, a management object and a safety strategy in relation to the CIM agent.

3. The method of claim 2, wherein registering, by the CIM agent, at least one of information of the CIM agent and the discovered management agent further includes:

registering, by the management agent, respective information item in the registration request of the CIM agent in response to the discovery of the CIM agent, and
returning, by the discovered management agent, a response indicating the registration request is accepted by the CIM agent.

4. The method of claim 1, further including performing, by the management agent:
   setting up a communication connection with the CIM agent,
   capturing at least one CIM class from the CIM agent,
   determining a CIM schema to be converted from the CIM classes,
   determining an existence of a schema at the management agent corresponding to the CIM schema to be converted, and
   recording a corresponding relationship between the schema at the management agent corresponding to the converted CIM schema and the CIM agent.

5. The method of claim 1, wherein discovering, by the CIM agent, the management agent further includes:
   delivering, by the CIM agent, a multicast query in the management domain according to a dynamic discovery protocol of the management domain,
   receiving, by the CIM agent, information returned by the management domain, and
   determining, by the CIM agent, the management agent according to the information returned by the management domain.

6. A system for registering a Common Information Model (CIM) agent to a management agent in a computing environment, comprising:
   a processor device, in communication with the management agent and operational in the computing environment, wherein the processor device:
      discovers, by the CIM agent, the management agent in a management domain in response to an insertion of the CIM agent into the management domain; and
      self-registers, by the CIM agent, at least one of information of the CIM agent and the discovered management agent, the management agent compliant with the CIM agent;
         wherein the management agent converts a CIM schema of the CIM agent into a schema at the management agent identifiable by the management agent according to a mapping specification corresponding to a management model of the management domain in response to a determination of no schema at the management agent corresponding to the CIM schema to be converted in the management agent that is compliant with the CIM agent, and the management agent is determined by matching a management object scope, or safety strategy defined in a predefined strategy of the discovered management agent with a management object, or safety strategy of the CIM agent.

7. The system of claim 6, wherein the processor device, previous to matching the management object scope, initiates, by the CIM agent, a registration request to the discovered management agent, wherein the registration request includes at least one of a CIM agent location, a domain name space, a management object and a safety strategy in relation to the CIM agent.

8. The system of claim 7, wherein the processor device, pursuant to registering, by the CIM agent, at least one of information of the CIM agent and the discovered management agent:

registers, by the management agent, respective information item in the registration request of the CIM agent in response to the discovery of the CIM agent, and returning, by the discovered management agent, a response indicating the registration request is accepted by the CIM agent.

9. The system of claim 6, wherein the processor device, by the management agent, performs each of:

setting up a communication connection with the CIM agent, capturing at least one CIM class from the CIM agent, determining a CIM schema to be converted from the CIM classes, determining an existence of a schema at the management agent corresponding to the CIM schema to be converted, and recording a corresponding relationship between the schema at the management agent corresponding to the converted CIM schema and the CIM agent.

10. The system of claim 6, wherein discovering, by the CIM agent, the management agent further includes:

delivering, by the CIM agent, a multicast query in the management domain according to a dynamic discovery protocol of the management domain, receiving, by the CIM agent, information returned by the management domain, and determining, by the CIM agent, the management agent according to the information returned by the management domain.

11. The system according to claim 10, wherein the management agent is a Web Services for Management (WS-Management) agent and the dynamic discovery protocol is Web Services (WS) dynamic discovery protocol.

12. A computer program product for registering a Common Information Model (CIM) agent to a management agent in a computing environment by a processor device, the computer program product comprising a non-transitory computer-readable storage medium having computer-readable program code portions stored therein, the computer-readable program code portions comprising:

a first executable portion that discover, by the CIM agent, the management agent in a management domain in response to an insertion of the CIM agent into the management domain; and a second executable portion that self-registers, by the CIM agent, at least one of information of the CIM agent and the discovered management agent, the management agent compliant with the CIM agent;

wherein the management agent converts a CIM schema of the CIM agent into a schema at the management agent identifiable by the management agent according to a mapping specification corresponding to a management model of the management domain in response to a determination of no schema at the management agent corresponding to the CIM schema to be converted in the management agent that is compliant with the CIM agent, and the management agent is determined by matching a management object scope, or safety strategy defined in a predefined strategy of the discovered management agent with a management object, or safety strategy of the CIM agent.

13. The computer program product of claim 12, further including a third executable portion that, previous to matching the management object scope, initiates, by the CIM agent, a registration request to the discovered management agent, wherein the registration request includes at least one of a CIM agent location, a domain name space, a management object and a safety strategy in relation to the CIM agent.

14. The computer program product of claim 13, further including a fourth executable portion that, pursuant to registering, by the CIM agent, at least one of information of the CIM agent and the discovered management agent:

registers, by the management agent, respective information item in the registration request of the CIM agent in response to the discovery of the CIM agent, and returns, by the discovered management agent, a response indicating the registration request is accepted by the CIM agent.

15. The computer program product of claim 12, further including a third executable portion that performs, by the management agent:

setting up a communication connection with the CIM agent, capturing at least one CIM class from the CIM agent, determining a CIM schema to be converted from the CIM classes, determining an existence of a schema at the management agent corresponding to the CIM schema to be converted, and recording a corresponding relationship between the schema at the management agent corresponding to the converted CIM schema and the CIM agent.

16. The computer program product of claim 12, further including a third executable portion that, pursuant to discovering, by the CIM agent, the management agent:

delivers, by the CIM agent, a multicast query in the management domain according to a dynamic discovery protocol of the management domain, receives, by the CIM agent, information returned by the management domain, and determines, by the CIM agent, the management agent according to the information returned by the management domain.

* * * * *